United States Patent
Moyer et al.

(10) Patent No.: US 10,339,063 B2
(45) Date of Patent: Jul. 2, 2019

(54) SCHEDULING INDEPENDENT AND DEPENDENT OPERATIONS FOR PROCESSING

(71) Applicant: Advanced Micro Devices, Inc., Sunnyvale, CA (US)

(72) Inventors: Paul James Moyer, Fort Collins, CO (US); Richard Martin Born, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 59 days.

(21) Appl. No.: 15/213,981

(22) Filed: Jul. 19, 2016

(65) Prior Publication Data
US 2018/0024934 A1    Jan. 25, 2018

(51) Int. Cl.
| | |
|---|---|
| G06F 12/00 | (2006.01) |
| G06F 13/00 | (2006.01) |
| G06F 12/0877 | (2016.01) |
| G06F 9/38 | (2018.01) |

(52) U.S. Cl.
CPC ........ *G06F 12/0877* (2013.01); *G06F 9/3836* (2013.01); *G06F 9/3855* (2013.01); *G06F 2212/60* (2013.01)

(58) Field of Classification Search
CPC .......................... G06F 12/0877; G06F 2212/60
USPC .......................................................... 711/118
See application file for complete search history.

(56) References Cited

U.S. PATENT DOCUMENTS

| | | | | |
|---|---|---|---|---|
| 5,197,011 | A * | 3/1993 | Biemans | .......... G05B 19/41835 700/96 |
| 5,751,983 | A * | 5/1998 | Abramson | ............ G06F 9/3834 712/216 |
| 6,950,927 | B1 | 9/2005 | Apisdorf et al. | |
| 9,104,500 | B1 | 8/2015 | Krikellas et al. | |
| 9,197,715 | B2 * | 11/2015 | Koike | ..................... H04L 67/32 |
| 9,632,826 | B2 * | 4/2017 | Edelstein | .............. G06F 9/4881 |
| 2003/0097499 | A1* | 5/2003 | Ennis | .................. H04L 47/6285 710/36 |
| 2005/0262159 | A1 | 11/2005 | Everhart et al. | |
| 2008/0215832 | A1* | 9/2008 | Allen | .................. G06F 13/4243 711/158 |

(Continued)

OTHER PUBLICATIONS

International Search Report and Written Opinion dated Oct. 20, 2017 for PCT/US2017/042333, 12 pages.

(Continued)

*Primary Examiner* — Sheng Jen Tsai

(57) ABSTRACT

A processor includes an operations scheduler to schedule execution of operations at, for example, a set of execution units or a cache of the processor. The operations scheduler periodically adds sets of operations to a tracking array, and further identifies when an operation in the tracked set is blocked from execution scheduling in response to, for example, identifying that the operation is dependent on another operation that has not completed execution. The processor further includes a counter that is adjusted each time an operation in the tracking array is blocked from execution, and is reset each time an operation in the tracking array is executed. When the value of the counter exceeds a threshold, the operations scheduler prioritizes the remaining tracked operations for execution scheduling.

17 Claims, 4 Drawing Sheets

(56) References Cited

U.S. PATENT DOCUMENTS

| | | | |
|---|---|---|---|
| 2008/0235466 A1* | 9/2008 | Traister | G11C 16/10 711/154 |
| 2008/0235480 A1* | 9/2008 | Traister | G06F 9/30032 711/167 |
| 2009/0003593 A1* | 1/2009 | Gopal | G06F 7/5324 380/30 |
| 2012/0036509 A1* | 2/2012 | Srinivasan | G06F 9/526 718/102 |
| 2014/0229953 A1 | 8/2014 | Sevastiyanov et al. | |
| 2014/0258697 A1* | 9/2014 | Sudhakar | G06F 9/3836 712/245 |
| 2015/0286261 A1 | 10/2015 | Bose et al. | |
| 2016/0077870 A1* | 3/2016 | Pho | G06F 9/4881 718/103 |
| 2016/0188246 A1* | 6/2016 | Makida | G06F 3/061 711/158 |
| 2016/0191322 A1* | 6/2016 | Bita | G06F 3/061 709/226 |
| 2016/0358305 A1* | 12/2016 | Banerjee | G06T 1/20 |
| 2017/0083343 A1* | 3/2017 | Burger | G06F 9/3004 |
| 2017/0185533 A1* | 6/2017 | Rozas | G06F 12/1408 |
| 2017/0242700 A1* | 8/2017 | Hughes | G06F 9/30043 |

OTHER PUBLICATIONS

International Preliminary Report on Patentability dated Jan. 31, 2019 for corresponding International Application No. PCT/US2017/042333, 9 pages.

\* cited by examiner

SCHEDULING INDEPENDENT AND DEPENDENT OPERATIONS FOR PROCESSING

BACKGROUND

Description of the Related Art

To improve processing efficiency, a processor can schedule operations in an out-of-order fashion relative to a program order of instructions being executed at the processor. For example, the processor can schedule operations out-of-order at execution units of the processor, and can schedule memory access operations out-of-order at a processor cache. Scheduling operations out-of-order can improve processing efficiency by preventing relatively slow to execute operations from delaying the execution of other operations that are ready to execute. However, out-of-order execution can cause errors when a particular operation is dependent on another operation, such as when one operation uses the results of the other operation as an input value. To prevent such errors, the processor can employ a scheduler to schedule operations for execution. The scheduler identifies dependencies between operations, and prevents dependent operations from being scheduled for execution before the operations from which they depend. However, conventional schedulers sometimes allow dependent operations to remain pending at the scheduler for a relatively long time, reducing processing efficiency.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for tracking pending operations at a processor and prioritizing scheduling of the tracked operations for execution when the tracked operations have been blocked from execution a threshold number of times. The processor includes an operations scheduler to schedule execution of operations at, for example, a set of execution units or a cache of the processor. The operations scheduler periodically adds sets of operations to a tracking array, and further identifies when an operation in the tracked set is blocked from execution scheduling in response to, for example, identifying that the operation is dependent on another operation that has not completed execution. The processor further includes a counter that is adjusted each time an operation in the tracking array is blocked from execution, and is reset each time an operation in the tracking array is executed. When the value of the counter exceeds a threshold, the operations scheduler prioritizes the remaining tracked operations for execution scheduling, such as by preventing pending operations that are not in the tracking array from being scheduled for execution. The operations scheduler thus facilitates processing efficiency by ensuring that dependent operations are not indefinitely blocked from execution.

Figure 1:
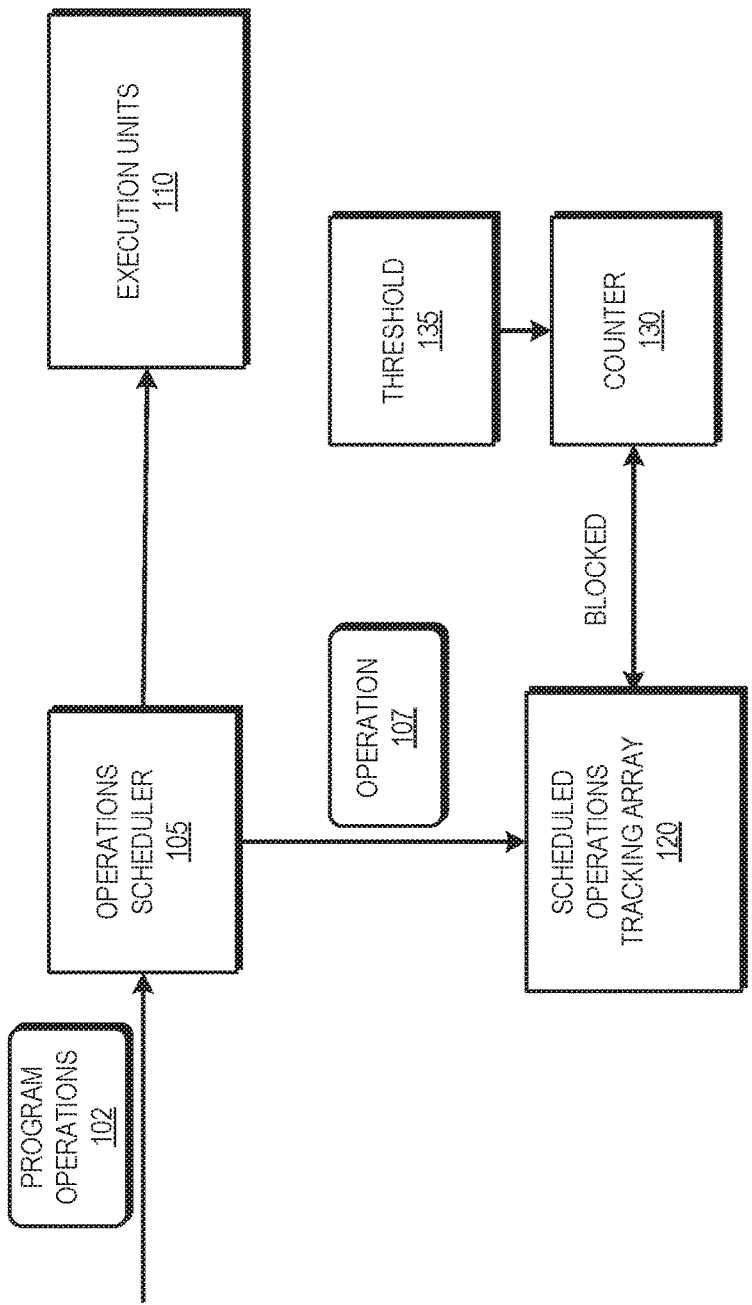
FIG. 1 is a block diagram of a processing system that tracks pending operations and prioritizes scheduling of the tracked operations when the pending operations have been blocked from execution a threshold number of times in accordance with some embodiments.

FIG. 1 illustrates a processing system 100 that tracks scheduled operations and temporarily suspends scheduling new operations when the number of times currently pending scheduled operations have been blocked from execution exceeds a threshold in accordance with some embodiments. The processing system 100 is generally configured to execute sets of operations organized in the form of computer programs in order to carry out tasks on behalf of an electronic device. Accordingly, the processing system 100 may be used in any of a variety of electronic devices, such as a desktop or laptop computer, server, smartphone, tablet, game console, and the like.

To facilitate execution of instructions, the processing system 100 includes an operations scheduler 105, a scheduled operations tracking array 120, a counter 130 having a threshold 135, and one or more execution units 110. In some embodiments, the processing system 100 may further include one or more memory caches and a main memory (not shown), each of which are memory devices generally configured to store data, and is therefore one or more of random access memory (RAM) memory modules, non-volatile memory devices (e.g., flash memory), and the like.

The operations scheduler 105 is a module such as, for example, a memory controller, I/O controller, and the like which includes digital and/or analog circuitry configured and connected to receive a series of program operations 102 from, for example, a dispatch stage (not shown) of an instruction pipeline or from a load/store unit of the instruction pipeline. In some embodiments, the operations are program operations configured to be executed at a set of execution units, such as an integer unit, a floating point unit, and the like. In other embodiments, the operations are memory access operations, such as load operations and store operations, configured to be executed at a cache (not shown) of the processor.

Each of the operations in the series of program operations 102 may be independent of the other operations in the series of program operations 102, or may be dependent on one or more other operations in the series of program operations 102. An independent operation is one that can be properly executed (that is, executed so that it will achieve expected results) by the one or more execution units 110 without waiting for any other pending operation to complete execution. In contrast, a dependent operation is one that cannot be properly executed at the execution units 110 until one or more other pending operations complete execution. An example of a dependent operation is an addition operation that has as one of its inputs a result of a load operation. The addition operation cannot be properly executed until the load operation is complete, and the addition operation is therefore dependent on the addition operation.

The operations scheduler 105 is generally configured to store the received operations 102 and to select stored operations for provision to the execution units 110, thereby scheduling the selected operation for execution. In some embodiments, the operations scheduler 105 assigns each received operation an initial age value and increments the age value for each operation in response to a different operation being scheduled for execution. The operations scheduler 105 selects the next operation to be scheduled based on the age values of the stored operations, such as by selecting the operation having the highest, or oldest, age value.

In some embodiments, after selecting an operation based on its age value, the operations scheduler 105 identifies if the selected operation is dependent on another operation. This dependency check may be performed according to any of a variety of dependency-checking techniques, such as by the dependent operations including a pointer to the operation from which it depends, and the operations scheduler 105 reviewing a list of recently executed operations to identify if the dependent operation points to an already executed operation. In response to identifying that a selected operation is an independent operation (either because it never depended on another operation, or because all of the operations from which it previously depended have completed execution) the operation scheduler 105 schedules the operation for execution by providing the operation to the execution units 110. In response to identifying that the selected operation is a dependent operation, the operations scheduler 105 does not provide the selected operation to the execution units 110, but instead selects another operation. The suppression of providing the selected operation in response to identifying the operation as a dependent operation is referred to herein as blocking the operation. In some embodiments, in response to blocking an operation the operation scheduler 105 resets its age value to a lower value, thereby ensuring that the blocked operation is not immediately selected again for execution.

For some patterns of received operations, the operation selection scheme results in dependent operations being repeatedly blocked, and therefore pending at the operation scheduler 105 for a relatively long amount of time, thereby reducing overall processing efficiency. To address these received operations patterns, the processing system 100 includes a scheduled operations tracking array 120, which operates in conjunction with a counter 130 having a threshold 135 to allow out of sequence scheduling of both independent and dependent operations until the number of pending operations that are blocked by dependencies exceeds the threshold 135, as described further herein. The scheduled operations tracking array 120 is an array or vector configured to track pending operations. The operations scheduler 105 is generally configured to add operations (e.g., operation 107) to the tracking array 120, either by adding the data corresponding to the operations themselves to the tracking array 120, or by adding indicators (e.g., tags) corresponding to the operations being added. In some embodiments, the operations scheduler 105 periodically, or in response to a set of specified conditions, adds all pending operations to the tracking array 120. In other embodiments, the operations scheduler 105 adds each received operation to the tracking array 120 until a threshold number of operations is reached. In some embodiments, the operations scheduler 105 stores only a subset (i.e., less than all) of the operations that are pending to be scheduled for execution at the execution units 110.

The counter 130 is generally configured to store an adjustable value. In response to a reset event indicated by a reset signal, the counter 130 initializes the stored value to a reset value (e.g., zero) and adjusts (e.g., increments) the stored value each time any of the operations in the tracking array 120 is blocked from execution by the operations scheduler 105. That is, each time an operation is blocked from being executed, the counter 130 increments, without regard to whether the operation being blocked is being blocked for the first time or was previously blocked. Thus, for example, if the scheduled operations tracking array 120 is populated with four scheduled operations, the first of which has been blocked once, the second of which has been blocked twice, the third of which has been never been blocked, and the fourth of which has been blocked once, the counter will have incremented four times. In some embodiments, when an operation in the scheduled operations tracking array 120 is scheduled by the operations scheduler 105, the tracking array 120 removes the scheduled operation from the scheduled operations tracking array 120, and the counter 130 is reset to its initial value. In other embodiments, rather than fully resetting the counter 130 when a tracked operation is scheduled, the counter 130 adjusts its stored value towards the reset value and away from the threshold value (e.g., decrements the stored value).

The threshold 135 is a programmable register that stores a limit for the number of times operations tracked by the tracking array 120 are permitted be blocked before they are prioritized by the operations scheduler 105. To illustrate, in response to the value of the counter 130 exceeding the threshold 135, the operations scheduler 105 prioritizes the operations stored at the tracking array 120 for scheduling at the execution units 110. In some embodiments, the operations scheduler 105 prioritizes scheduling of operations not stored at the scheduled operations tracking array 120 until at least one of the operations stored at the tracking array 120 has been scheduled at the execution units 110. The processing system 100 thus ensures that operations that have been repeatedly blocked are prioritized for execution, improving processing efficiency.

Figure 2:
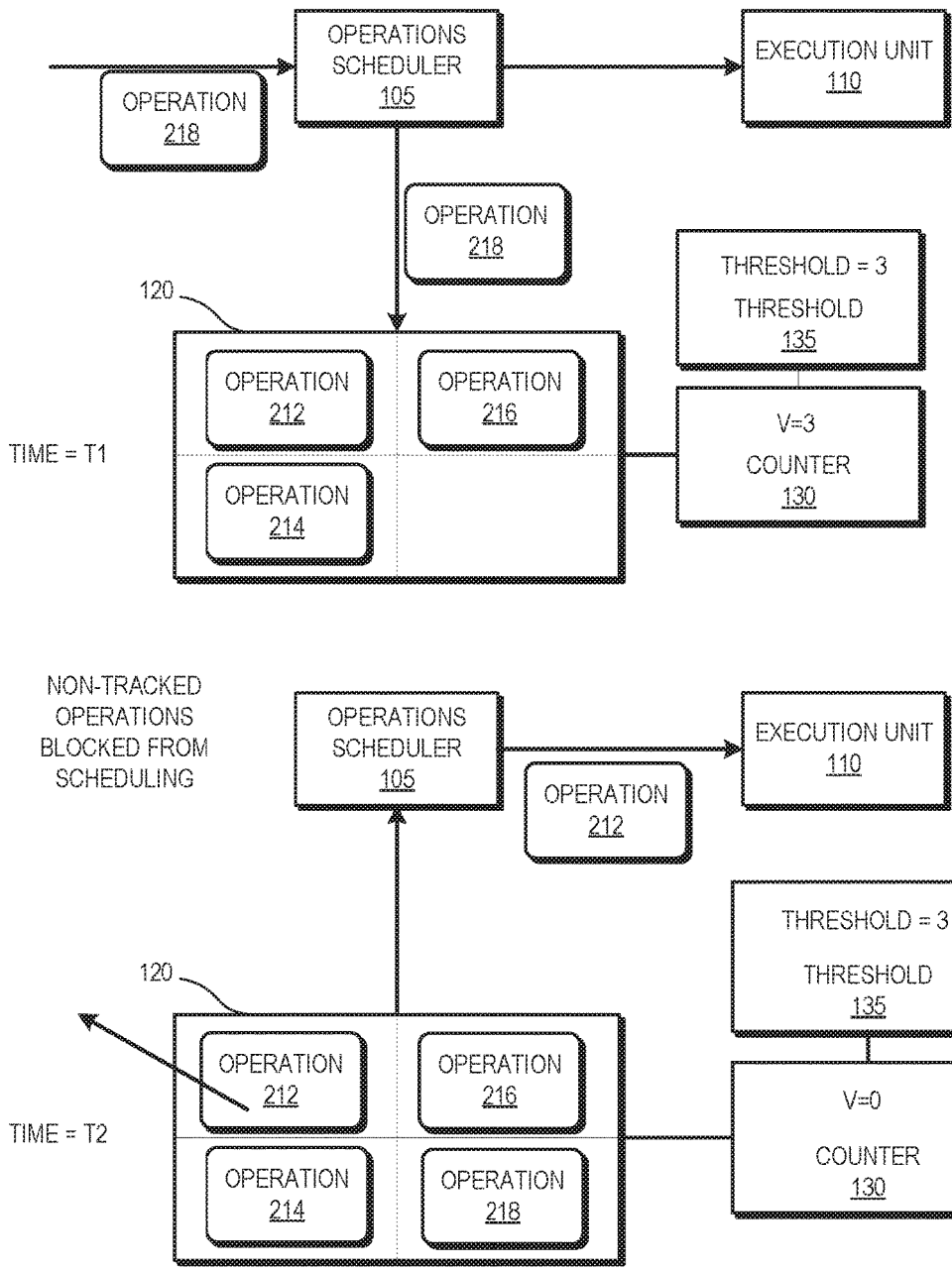
FIG. 2 is a block diagram of an example of the processing system of FIG. 1 scheduling operations before and after a threshold number of blocked operations has been exceeded in accordance with some embodiments.

FIG. 2 illustrates an example of the processing system of FIG. 1 scheduling operations before and after a threshold number of blocked operations has been exceeded in accordance with some embodiments. In the depicted example, at a time T1, the scheduled operations tracking array 120 contains operations 212, 214, and 216. The counter 130 has a value of 3, and the threshold 135 has been set to 3. In addition, at time T1 the operations scheduler 105 adds operation 218 to the tracking array 120 in response to specified conditions, such as receiving the operation, in response to a threshold number of operations being received at the operations scheduler 105, and the like.

At later time T2, operation 212 is selected by the operations scheduler 105, and is determined to be an independent operation. In response, the operations scheduler 105 schedules the operation 212 for execution by providing the operation to the execution units 110. In addition, the operations scheduler 105 sends control signaling to the tracking array 120 to remove the operation 212, and sends control signaling to the counter 130 to reset the counter value to its initial value of zero. Thus, in the example of FIG. 2, the tracked operations are not blocked a threshold number of times, and are therefore not prioritized for scheduling by the operations scheduler 105.

Figure 3:
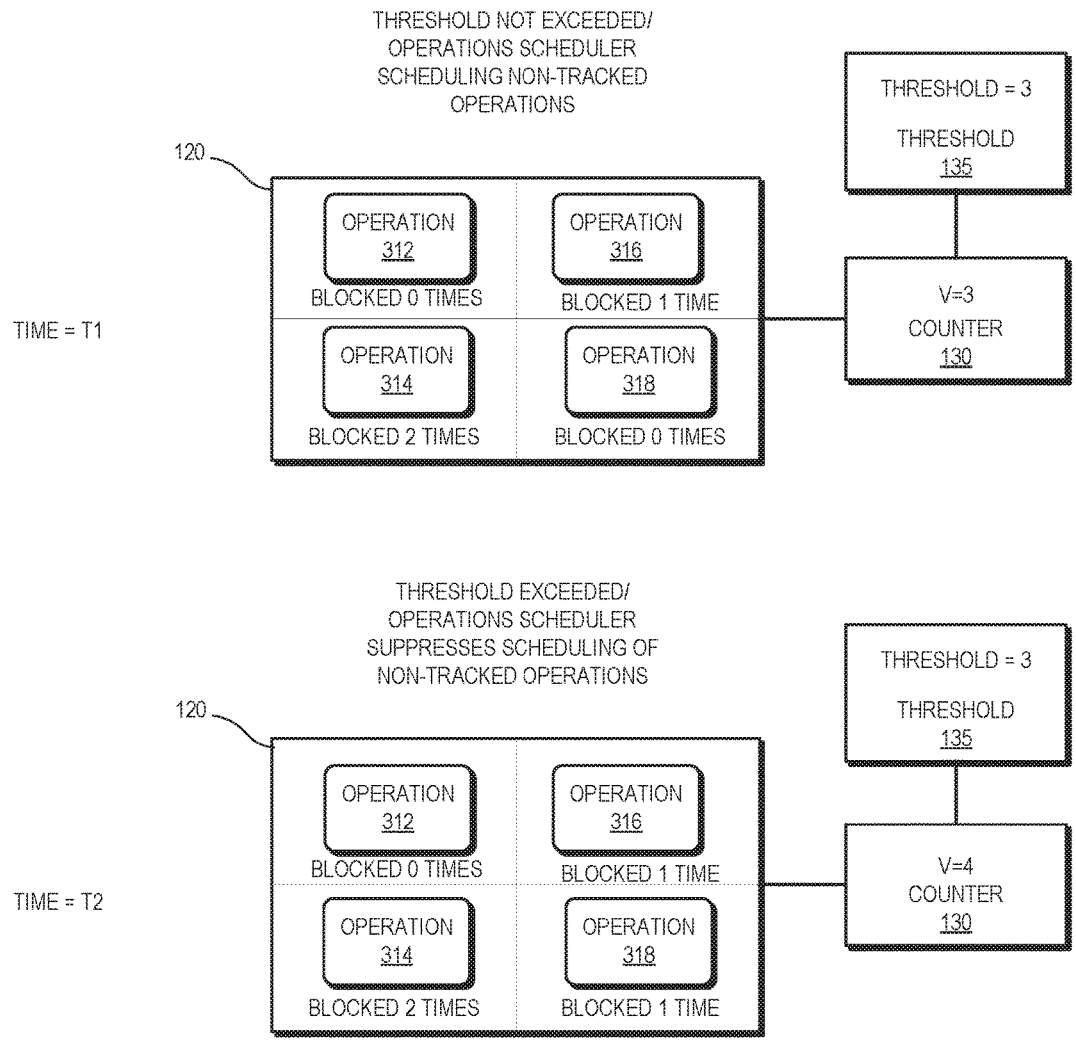
FIG. 3 is a block diagram of an example of the tracking array and counter of the processing system of FIG. 1 identifying a threshold number of blocked operations has been exceeded in accordance with some embodiments.

FIG. 3 illustrates an example of the tracking array and counter of the processing system of FIG. 1 identifying a threshold number of blocked operations has been exceeded in accordance with some embodiments. In the illustrated example, at time T1, the scheduled operations tracking array 120 contains four scheduled operations: scheduled operation 312, which at time T1 has been blocked from execution 0 times; scheduled operation 314, which at time T1 has been blocked from execution 2 times; scheduled operation 316, which at time T1 has been blocked from execution 1 time; and scheduled operation 318, which at time T1 has been blocked from execution 0 times. The counter 130 stores a value of 3, which reflects the sum of the number of times each scheduled operation in the scheduled operations tracking array 120 has been blocked as of time T1. At time T1, the value of the counter 130 does not exceed the threshold 135, which has been set to 3. Accordingly, the operations scheduler (not shown) does not prioritize the tracked operations (the operations stored at the tracking array 120) at time T1.

At a later time T2 the scheduled operations tracking array 120 contains four scheduled operations: operation 312, which at time T2 has been blocked from execution 0 times; operation 314, which at time T2 has been blocked from execution 2 times; operation 316, which at time T2 has been blocked from execution 1 time; and scheduled operation 318, which at time T2 has been blocked from execution 1 time. The counter 130 has a value of 4, which reflects the sum of the number of times each scheduled operation in the scheduled operations tracking array 120 has been blocked as of time T2. At time T2, the value of the counter 130 exceeds the threshold 335, which has been set to 3. Accordingly, the operations scheduler 105 (not shown) prioritizes operations stored at the tracking array 120 for scheduling at the execution units 110. In some embodiments, the operations scheduler 105 prioritizes the tracked operations by assigning the operations higher age values than non-tracked operations (operations not stored at the tracking array 120) and maintaining the higher age values for the tracked operations until all of the tracked operations have been scheduled for execution at the execution units 110. In some embodiments, the counter 130 is a saturating counter that saturates at the threshold value. In such embodiments, when the value of the counter 130 equals the threshold 335, the operations scheduler 105 (not shown) prioritizes operations stored at the tracking array 120 for scheduling at the execution units 110.

Figure 4:
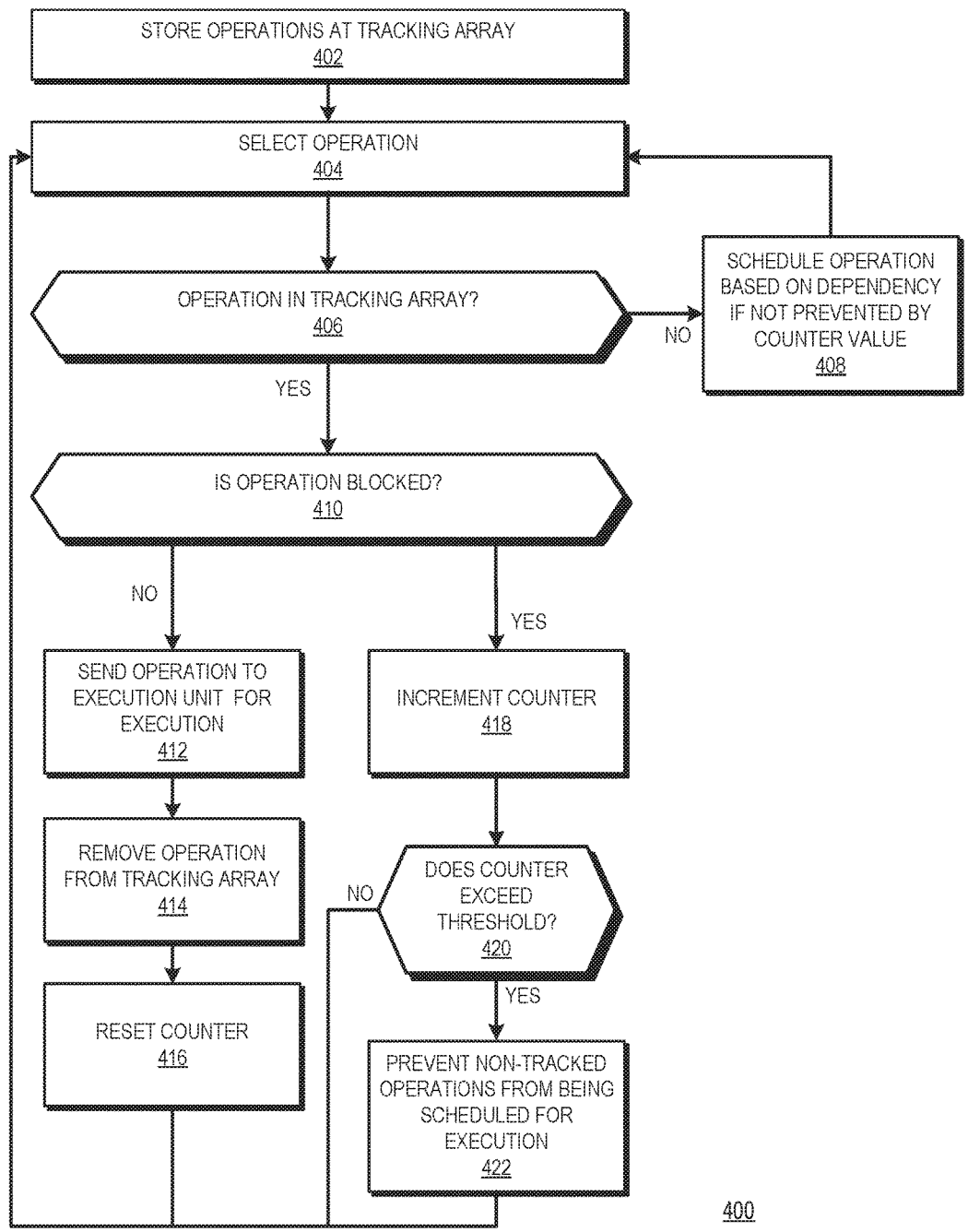
FIG. 4 is a flow diagram illustrating a method of scheduling operations for execution that prioritizes scheduling of pending operations when the pending operations have been blocked from execution a threshold number of times in accordance with some embodiments.

FIG. 4 is a flow diagram of a method 400 scheduling operations for execution that prioritizes scheduling of pending operations when the pending operations have been blocked from execution a threshold number of times in accordance with some embodiments. At box 402, the operations scheduler 105 stores a set of operations at the tracking array 120. At block 404 the operations scheduler 105 selects a pending operation for potential scheduling. At block 406, the operations scheduler 105 identifies whether the selected operation is stored at the tracking array 120. If not, the method flow moves to block 408 and the operations scheduler 105 determines whether to schedule the operation normally. In particular, the operations scheduler 105 determines whether the selected operation is dependent on another operation and, if so, blocks the selected operation. If the selected operation is not dependent on another operation and the counter threshold has not been exceeded at block 420 (described below), the operations scheduler 105 schedules the operation for execution at the execution units 110. If the counter threshold at block 420 has been exceeded, the selected operation is not scheduled, as described further below.

Returning to block 406, if the selected operation is stored at the tracking array 120, the method flow proceeds to block 410 and the operations scheduler 105 determines whether the selected operation is dependent on another operation. If not, the method flow proceeds to block 412 and the operations scheduler 105 schedules the selected operation for execution by providing the selected operation to the execution units 110 for execution. The method moves to block 414 and the operations scheduler 105 removes the selected operation from the tracking array 120, and resets the counter to an initial value at block 416. The method then returns to block 404 where another operation is selected.

Returning to block 410, if the selected operation is dependent on another operation, the operations scheduler 105 blocks the operation. In response, the method flow proceeds to block 418 and the operations scheduler 105 increments the counter 130. At block 420 the operations scheduler 105 determines whether the counter value exceeds the threshold 135. If not, the method flow returns to block 404 where another operation is selected. If, at block 420 the operations scheduler 105 determines that the counter value exceeds the threshold 135, the method flow moves to block 422 and the operations scheduler prevents operations not stored at the tracking array 120 from being scheduled for execution until at least one of the operations stored at the tracking array 120 has been scheduled.

In some embodiments, certain aspects of the techniques described above may implemented by one or more processors of a processing system executing software. The software comprises one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
    adding a first operation to a tracking array of a processor in response to the first operation being received for scheduling for execution at the processor and assigning the first operation a first age value;
    adjusting the first age value in response to scheduling a second operation from the tracking array;
    selecting the first operation for execution based on the first age value;
    after selecting the first operation for execution, blocking the first operation from being issued to an execution unit responsive to identifying that the first operation is dependent on a third operation;
    in response to blocking the first operation, resetting the first age value to an initial value and maintaining the first operation at the tracking array;
    adjusting a value of a counter by a first adjustment in response to blocking the first operation from being scheduled for execution while the first operation is stored at the tracking array; and
    in response to the value of the counter exceeding a threshold, suppressing scheduling of execution operations not stored the tracking array.

2. The method of claim 1, further comprising resetting the counter in response to the first operation being scheduled for execution while the first operation is stored at the tracking array.

3. The method of claim 1, wherein:
    the value of the counter is adjusted by a second adjustment in response to an operation stored at the tracking array being scheduled for execution.

4. The method of claim 1, wherein the first operation is an operation awaiting scheduling for execution at an execution unit of the processor.

5. The method of claim 1, wherein the first operation is a memory access request awaiting scheduling for execution at a cache of the processor.

6. The method of claim 1, wherein the adding includes adding a plurality of operations ready for scheduling for execution at the processor to the tracking array, the plurality of operations including the first operation.

7. A method, comprising:
    adding to a tracking array a plurality of operations ready for scheduling for execution at a processor;
    adjusting a first age value associated with a first operation of the plurality of operations in response to scheduling a second operation of the plurality of operations for execution at the processor;
    selecting the first operation for execution based on the first age value;
    after selecting the first operation for execution, blocking the first operation from execution in response to identifying that the first operation is dependent on a third operation;
    in response to blocking the first operation, resetting the first age value to an initial value and maintaining the first operation at the tracking array;
    adjusting a counter in response to the first operation of the plurality of operations being blocked for scheduling for execution while the first operation is stored at the tracking array; and
    in response to the counter exceeding a threshold, prioritizing operations stored at the tracking array for execution at the processor.

8. The method of claim 7, further comprising removing the first operation from the tracking array in response to the first operation being scheduled for execution at the processor.

9. The method of claim 8, further comprising:
    resetting the counter in response to the first operation being scheduled for execution at the processor.

10. The method of claim 8, wherein:
    the prioritizing comprises suppressing operations ready for scheduling and not stored at the tracking array from being scheduled for execution.

11. The method of claim 8, wherein the second operation is stored at the tracking array.

12. A processor, comprising:
    an operations scheduler configured to schedule operations for execution at the processor;
    a tracking array configured to store a set of operations at the operations scheduler;
    a counter configured to adjust a value by a first adjustment in response to a first operation stored at the tracking array being blocked from being scheduled for execution at the operations scheduler; and
    wherein the operations scheduler is configured to:
        adjust a first age value associated with the first operation in response to scheduling a second operation stored at the tracking array for execution;
        select the first operation for execution based on the first age value;
        after selecting the first operation for execution, block the first operation in response to identifying the first operation is dependent on a third operation;
        in response to blocking the first operation, resetting the first age value to an initial age value and maintaining the first operation at the tracking array; and
        in response to the value of the counter exceeding a threshold, prioritize operations stored at the tracking array for execution.

13. The processor of claim 12, wherein the counter is configured to reset the value in response to the first operation being scheduled for execution while the first operation is stored at the tracking array.

14. The processor of claim 12, wherein the counter is configured to adjust the value of the counter by a second adjustment in response to an operation stored at the tracking array being scheduled for execution.

15. The processor of claim 12, wherein the first operation is an operation awaiting scheduling for execution at an execution unit of the processor.

16. The processor of claim 12, wherein the first operation is a memory access request awaiting scheduling for execution at a cache of the processor.

17. The processor of claim 12, wherein the set of operations comprises a set of operations concurrently ready for scheduling at the operations scheduler.

* * * * *

UNITED STATES PATENT AND TRADEMARK OFFICE
CERTIFICATE OF CORRECTION

PATENT NO. : 10,339,063 B2
APPLICATION NO. : 15/213981
DATED : July 19, 2016
INVENTOR(S) : Paul James Moyer et al.

Page 1 of 1

It is certified that error appears in the above-identified patent and that said Letters Patent is hereby corrected as shown below:

In the Claims

At Column 7, Line 49, please delete "stored the tracking" and substitute --stored at the tracking--.

Signed and Sealed this
Twenty-fourth Day of December, 2019

Andrei Iancu
*Director of the United States Patent and Trademark Office*